(12) United States Patent
Avigad et al.

(10) Patent No.: US 11,477,942 B2
(45) Date of Patent: Oct. 25, 2022

(54) ROBOTIC FRUIT HARVESTING MACHINE WITH FRUIT-PAIR PICKING AND HYBRID MOTORIZED-PNEUMATIC ROBOT ARMS

(71) Applicant: FFROBOTICS LTD., Zoran (IL)

(72) Inventors: Gideon Avigad, London (CA); Shaul Salomon, Harashim (IL); Avi Kahani, Zoran (IL); Yoav Koster, Zoran (IL)

(73) Assignee: FFROBOTICS LTD., Qadima Zoran (IL)

( * ) Notice: Subject to any disclaimer, the term of this patent is extended or adjusted under 35 U.S.C. 154(b) by 472 days.

(21) Appl. No.: 16/665,013

(22) Filed: Oct. 28, 2019

(65) Prior Publication Data

US 2020/0128744 A1    Apr. 30, 2020

Related U.S. Application Data

(60) Provisional application No. 62/751,782, filed on Oct. 29, 2018.

(51) Int. Cl.
*B25J 9/00* (2006.01)
*A01D 46/30* (2006.01)
*B25J 18/02* (2006.01)
*B25J 19/02* (2006.01)
(Continued)

(52) U.S. Cl.
CPC ............ *A01D 46/30* (2013.01); *B25J 9/0084* (2013.01); *B25J 9/0093* (2013.01); *B25J 18/025* (2013.01); *B25J 19/023* (2013.01); *A01D 46/005* (2013.01); *A01D 46/24* (2013.01)

(58) Field of Classification Search
USPC ................................................. 700/245–264
See application file for complete search history.

(56) References Cited

U.S. PATENT DOCUMENTS

| 3,646,741 A | 3/1972 | Edwards et al. |
| 3,766,724 A | 10/1973 | Paillou |
| 3,783,595 A | 1/1974 | Tolochko et al. |

(Continued)

FOREIGN PATENT DOCUMENTS

| DE | 4116728 A1 | 12/1991 |
| JP | 08103139 A | 4/1996 |

(Continued)

OTHER PUBLICATIONS

Meccanica Zucal, "Model Z11", pp. 1-12, Jan. 12, 2013.
(Continued)

*Primary Examiner* — Jonathan L Sample
(74) *Attorney, Agent, or Firm* — Kligler & Associates Patent Attorneys Ltd

(57) ABSTRACT

A harvesting system includes a vertical frame, a plurality of linear robots, a plurality of cameras and a processor. The vertical frame is configured to be positioned opposite a sector to be harvested. The robots are arranged in pairs stacked vertically in the frame, each pair including first and second robots that are configured to move together along a vertical axis, to move independently of one another along a horizontal axis, and have respective first and second robot arms that are configured to approach the sector and harvest fruit. The plurality of cameras is configured to acquire images of the sector. The processor is configured to identify the fruit in the images and control the robots to harvest the fruit.

12 Claims, 4 Drawing Sheets

(51) Int. Cl.
*A01D 46/24* (2006.01)
*A01D 46/00* (2006.01)

(56) References Cited

U.S. PATENT DOCUMENTS

| | | | |
|---|---|---|---|
| 4,015,366 A * | 4/1977 | Hall, III | A01G 3/04 |
| | | | 193/25 E |
| 4,214,427 A | 7/1980 | Bobard et al. | |
| RE31,023 E * | 9/1982 | Hall, III | A01G 7/00 |
| | | | 193/25 E |
| 4,519,193 A | 5/1985 | Yoshida et al. | |
| 4,532,757 A * | 8/1985 | Tutle | A01D 46/24 |
| | | | 382/110 |
| 4,663,925 A * | 5/1987 | Terada | B25J 19/021 |
| | | | 414/730 |
| 4,975,016 A | 12/1990 | Pellenc et al. | |
| 5,544,474 A | 8/1996 | Finkelstein | |
| 5,946,896 A | 9/1999 | Daniels | |
| 5,987,862 A * | 11/1999 | Long | A01G 3/08 |
| | | | 56/16.8 |
| 6,442,920 B1 * | 9/2002 | Peterson | A01D 46/26 |
| | | | 56/328.1 |
| 6,445,983 B1 * | 9/2002 | Dickson | G05D 1/027 |
| | | | 701/472 |
| 6,671,582 B1 * | 12/2003 | Hanley | A01B 79/005 |
| | | | 47/1.01 R |
| 6,756,789 B1 * | 6/2004 | Parker | A01G 23/00 |
| | | | 324/637 |
| 7,080,498 B2 | 7/2006 | Etcheverry | |
| 7,096,090 B1 * | 8/2006 | Zweig | G05D 1/0022 |
| | | | 700/249 |
| 7,669,399 B2 | 3/2010 | Etcheverry | |
| 7,765,780 B2 * | 8/2010 | Koselka | A01D 46/30 |
| | | | 701/50 |
| 7,882,686 B2 | 2/2011 | Bryan, Jr. et al. | |
| 7,937,922 B2 | 5/2011 | Etcheverry | |
| 8,150,554 B2 * | 4/2012 | Anderson | G06Q 50/06 |
| | | | 701/50 |
| 8,321,365 B2 * | 11/2012 | Anderson | G06Q 50/02 |
| | | | 706/46 |
| 9,226,446 B2 * | 1/2016 | Moore | A01D 46/30 |
| 9,357,708 B2 * | 6/2016 | Chang | B25J 18/06 |
| 9,475,189 B2 * | 10/2016 | Kahani | A01D 46/30 |
| 9,532,508 B1 * | 1/2017 | Stubbs | G06V 10/10 |
| 10,255,670 B1 * | 4/2019 | Wu | H04N 7/183 |
| 11,202,409 B1 * | 12/2021 | Schroll | A01D 46/24 |
| 11,285,612 B2 * | 3/2022 | Yuan | B25J 13/00 |
| 2003/0033749 A1 | 2/2003 | Morris et al. | |
| 2003/0070409 A1 * | 4/2003 | Adams | A01D 46/005 |
| | | | 56/328.1 |
| 2004/0049473 A1 * | 3/2004 | Gower | G06Q 10/06 |
| | | | 707/999.1 |
| 2004/0200146 A1 * | 10/2004 | Leyns | A01G 9/143 |
| | | | 47/65 |
| 2005/0126144 A1 * | 6/2005 | Koselka | A01D 46/30 |
| | | | 56/10.2 R |
| 2006/0213167 A1 * | 9/2006 | Koselka | A01D 75/00 |
| | | | 56/10.2 A |
| 2007/0061041 A1 * | 3/2007 | Zweig | G05D 1/0261 |
| | | | 700/245 |
| 2007/0135962 A1 * | 6/2007 | Kawabe | G01S 17/74 |
| | | | 704/E15.045 |
| 2008/0010961 A1 | 1/2008 | Gray | |
| 2009/0231101 A1 * | 9/2009 | Hyde | A01G 9/006 |
| | | | 340/10.1 |
| 2010/0268562 A1 * | 10/2010 | Anderson | A01G 25/167 |
| | | | 705/7.25 |
| 2010/0268679 A1 * | 10/2010 | Anderson | G06N 5/02 |
| | | | 706/46 |
| 2011/0022231 A1 | 1/2011 | Walker et al. | |
| 2011/0047951 A1 * | 3/2011 | Moore | A01D 46/24 |
| | | | 56/328.1 |
| 2011/0137456 A1 * | 6/2011 | Koselka | A01D 91/00 |
| | | | 701/532 |
| 2012/0152877 A1 * | 6/2012 | Tadayon | B25J 5/005 |
| | | | 901/30 |
| 2013/0021157 A1 * | 1/2013 | Teeter | G09F 21/04 |
| | | | 29/446 |
| 2013/0126396 A1 | 5/2013 | Jones et al. | |
| 2013/0204437 A1 * | 8/2013 | Koselka | A01D 91/00 |
| | | | 701/25 |
| 2013/0340682 A1 * | 12/2013 | Bareket | A01J 5/007 |
| | | | 119/14.08 |
| 2014/0044237 A1 * | 2/2014 | Ferrer | B25J 7/00 |
| | | | 414/815 |
| 2014/0168412 A1 * | 6/2014 | Shulman | G06V 20/20 |
| | | | 348/89 |
| 2014/0314280 A1 * | 10/2014 | Lee | G01N 33/0098 |
| | | | 382/110 |
| 2015/0015697 A1 * | 1/2015 | Redden | A01G 7/00 |
| | | | 382/110 |
| 2015/0027044 A1 * | 1/2015 | Redden | A01G 22/20 |
| | | | 47/58.1 R |
| 2015/0186387 A1 * | 7/2015 | Funabashi | G06Q 50/02 |
| | | | 707/723 |
| 2015/0237790 A1 * | 8/2015 | Redden | A01C 21/00 |
| | | | 701/50 |
| 2015/0283701 A1 * | 10/2015 | Izhikevich | G06N 3/008 |
| | | | 700/250 |
| 2015/0283702 A1 * | 10/2015 | Izhikevich | G06N 3/008 |
| | | | 700/257 |
| 2016/0050852 A1 * | 2/2016 | Lee | H04N 7/18 |
| | | | 901/41 |
| 2016/0073584 A1 * | 3/2016 | Davidson | A01D 46/30 |
| | | | 294/198 |
| 2016/0120124 A1 * | 5/2016 | De Kleine | A01D 46/264 |
| | | | 56/329 |
| 2016/0193729 A1 * | 7/2016 | Williams | G05D 1/0274 |
| | | | 901/1 |
| 2016/0243696 A1 * | 8/2016 | Kahani | B25J 19/023 |
| 2017/0206532 A1 * | 7/2017 | Choi | G06Q 30/02 |
| 2017/0357400 A1 * | 12/2017 | Foster | G05D 1/0278 |
| 2018/0092304 A1 * | 4/2018 | Moore | G05D 1/0231 |
| 2018/0146618 A1 * | 5/2018 | Elazary | A01D 46/30 |
| 2018/0373937 A1 | 12/2018 | Shulman | |
| 2019/0208705 A1 * | 7/2019 | Pippi | A01D 46/264 |
| 2020/0029488 A1 * | 1/2020 | Bertucci | G06F 16/29 |
| 2020/0033274 A1 * | 1/2020 | Couture | B25J 9/1628 |
| 2020/0196528 A1 * | 6/2020 | Salisbury | A01D 46/253 |

FOREIGN PATENT DOCUMENTS

| | | | |
|---|---|---|---|
| JP | 2008206438 A | | 9/2008 |
| WO | 2006013593 A1 | | 2/2006 |
| WO | 2006063314 A2 | | 6/2006 |

OTHER PUBLICATIONS

English, J., "Robotic Mass Removal of Citrus Fruit", Energid Technologies, pp. 1-12, Apr. 3, 2012.
Sarig, Y., "Robotics of Fruit Harvesting: A State-of the-art Review," Journal of Agricultural Engineering Research, vol. 54, pp. 265-280, year 1993.
Peterson et al., "A Systems Approach to Robotic Bulk Harvesting of Apples," Transactions of the American Society of Agricultural Engineers, vol. 42, issue 4, pp. 871-876, year 1999.
Baeten et al., "Autonomous Fruit Picking Machine: A Robotic Apple Harvester," 6th International Conference on Field and Service Robotics—FSR 2007, pp. 1-10, Chamonix, France, Jul. 2007.
Scarfe et al., "Development of an Autonomous Kiwifruit Picking Robot," Proceedings of the 4th International Conference on Autonomous Robots and Agents, pp. 1-5, Feb. 10-12, 2009.
De-An et al., "Design and Control of an Apple Harvesting Robot," Biosystems Engineering, vol. 110, issue 2, pp. 112-122, Oct. 2011.
Kapach et al., "Computer vision for fruit harvesting robots—State of the art and challenges ahead," International Journal on Computational Vision and Robotics, vol. 3, Nos. 1/2, pp. 4-34, year 2012.
Nguyen et al., "Optimum Detaching Movement for Apples-Harvesting Robot", CIGR-AgEng 2012—International Conference

(56) References Cited

OTHER PUBLICATIONS of Agricultural Engineering: Agriculture and Engineering for a Healthier Life, Valencia, Spain, pp. 1-6, Jul. 8-12, 2012.

Kataoka et al., "Development of a harvesting hand for apples", Advanced Robotics, vol. 13, No. 3, pp. 293-294, year 1999.

Guo et al., "Design and Control of The Open Apple-Picking-Robot Manipulator", 3rd IEEE International Conference on Computer Science and Information Technology, pp. 5-8, Jul. 9-11, 2010.

Zhaoxiang et al., "Apple maturity discrimination and positioning system in an apple harvesting robot", New Zealand Journal of Agricultural Research, vol. 50, pp. 1103-1113, year 2007.

Setiawan et al., "A Low-Cost Gripper for an Apple Picking Robot", Proceedings of the 2004 IEEE International Conference on Robotics & Automation, pp. 4448-4453, Apr. 2004.

Bachche et al., "Design, Modeling and Performance Testing of End-Effector for Sweet Pepper Harvesting Robot Hand", Journal of Robotics and Mechatronics, vol. 25, No. 4, pp. 705-717, year 2013.

Miller et al., "Performance of Mechanical Thinners for Bloom or Green Fruit Thinning in Peaches", HortScience, vol. 45, No. 1, pp. 43-51, year 2011.

Ellis, K., "Developments in Technology and Automation for Tree Fruit", Presentation, pp. 1-29, Dec. 21, 2009 (http://www.slideshare.net/CASCrop/developments-in-technology-and-automationfor-tree-fruit).

Wrenn ., "Meet Wall-Ye: The French grape-picking robot which can work day and night—and may well put vineyard workers out of a job", pp. 1-43, 28 Sep. 28, 2012.

International Application # PCT/IB2019/059223 search report dated Jan. 23, 2020.

\* cited by examiner

ROBOTIC FRUIT HARVESTING MACHINE WITH FRUIT-PAIR PICKING AND HYBRID MOTORIZED-PNEUMATIC ROBOT ARMS

CROSS-REFERENCE TO RELATED APPLICATIONS

This application claims the benefit of U.S. Provisional Patent Application 62/751,782, filed Oct. 29, 2018, whose disclosure is incorporated herein by reference.

FIELD OF THE INVENTION

The present invention relates generally to agricultural machinery, and particularly to fruit-harvesting robots.

BACKGROUND OF THE INVENTION

Agricultural operations such as fruit harvesting traditionally involve intensive manual labor. Nevertheless, various solutions for automating these operations have been proposed. For example, Sarig provides a review of several fruit-picking robotics solutions, in "Robotics of Fruit Harvesting: A State-of-the-art Review," Journal of Agricultural Engineering Research, volume 54, 1993. U.S. Pat. No. 3,646,741 describes a crop harvesting apparatus that is particularly suited for picking of tree-borne crops such as fruit and nuts.

Peterson et al. describe a robotic bulk apple harvester, in "A Systems Approach to Robotic Bulk Harvesting of Apples," Transactions of the American Society of Agricultural Engineers, volume 42, issue 4, 1999. PCT International Publication WO 2006/063314 describes an agricultural robot system for harvesting, pruning, culling, weeding, measuring and managing of agricultural crops.

Beaten et al. describe an autonomous fruit picking machine, in "Autonomous Fruit Picking Machine: A Robotic Apple Harvester," 6$^{th}$ International Conference on Field and Service Robotics—FSR 2007, Chamonix, France, 2007. Scarfe et al. describe a kiwifruit-picking robot, in "Development of an Autonomous Kiwifruit Picking Robot," Proceedings of the 4$^{th}$ International Conference on Autonomous Robots and Agents, February, 2009.

U.S. Pat. No. 7,765,780 describes a robot that maps a field to determine plant locations, number and size of fruit on plants and approximate positions of fruit on each plant, and can then plan and implement an efficient picking plan for itself or another robot. De-An et al. describe a robotic device consisting of a manipulator, end-effector and image-based vision servo control system for harvesting apples, in "Design and Control of an Apple Harvesting Robot," Biosystems Engineering, volume 110, 2011.

A mass-removal approach for harvesting is proposed by Energid Technologies (Cambridge, Mass.) in "Robotic Mass Removal of Citrus Fruit," April, 2012.

U.S. Pat. No. 9,475,189 describes a harvesting system that includes multiple robots, one or more sensors and one or more computers. The robots are mounted on a common frame facing an area to be harvested, and are each configured to harvest crop items by reaching and gripping the crop items from a fixed angle of approach. The sensors are configured to acquire images of the area. The computers are configured to identify the crop items in the images, and to direct the robots to harvest the identified crop items.

SUMMARY OF THE INVENTION

An embodiment of the present invention that is described herein provides a harvesting system including a vertical frame, a plurality of linear robots, a plurality of cameras and a processor. The vertical frame is configured to be positioned opposite a sector to be harvested. The robots are arranged in pairs stacked vertically in the frame, each pair including first and second robots that are configured to move together along a vertical axis, to move independently of one another along a horizontal axis, and have respective first and second robot arms that are configured to approach the sector and harvest fruit. The plurality of cameras is configured to acquire images of the sector. The processor is configured to identify the fruit in the images and control the robots to harvest the fruit.

Typically, each of the robots has four degrees-of-freedom. In some embodiments, the processor is configured to identify in the images a clustered pair of fruit, and to direct a pair of the robots to adjoin one another and to synchronously harvest both fruit of the clustered pair. In an example embodiment, the processor is configured to direct the pair of the robots to grip both fruit of the clustered pair, and, only after both fruit are gripped, to pick the fruit of the clustered pair.

In a disclosed embodiment, the processor is configured to construct, based on the images, a model of the sector indicating 3-D coordinates of the fruit, orientations of the fruit and status of the fruit, and to derive from the model a work schedule for the plurality of the robots, the work schedule specifying (i) moving of the pairs of robots among vertical positions, and (ii) in each vertical position of a pair of robots, moving each of the robots in the pair horizontally and harvesting the fruit.

In some embodiments, each of the robot arms includes a pneumatic drive mechanism and an electrical-motor drive mechanism, both configured to extend and retract the robot arm. In an embodiment, the processor is configured to control the robot arm to approach the sector by jointly driving the pneumatic drive mechanism and the electrical-motor drive mechanism.

There is additionally provided, in accordance with an embodiment of the present invention, a harvesting method including positioning, opposite a sector to be harvested, a vertical frame having a plurality of linear robots arranged in pairs and stacked vertically in the frame, each pair including first and second robots that are configured to move together along a vertical axis, to move independently of one another along a horizontal axis, and have respective first and second robot arms that are configured to approach the sector and harvest fruit. Images of the sector are acquiring using a plurality of cameras. Using a processor, the fruit are identified in the images and the robots are controlled to harvest the fruit.

The present invention will be more fully understood from the following detailed description of the embodiments thereof, taken together with the drawings in which:

DETAILED DESCRIPTION OF EMBODIMENTS

Overview

Figure 1:
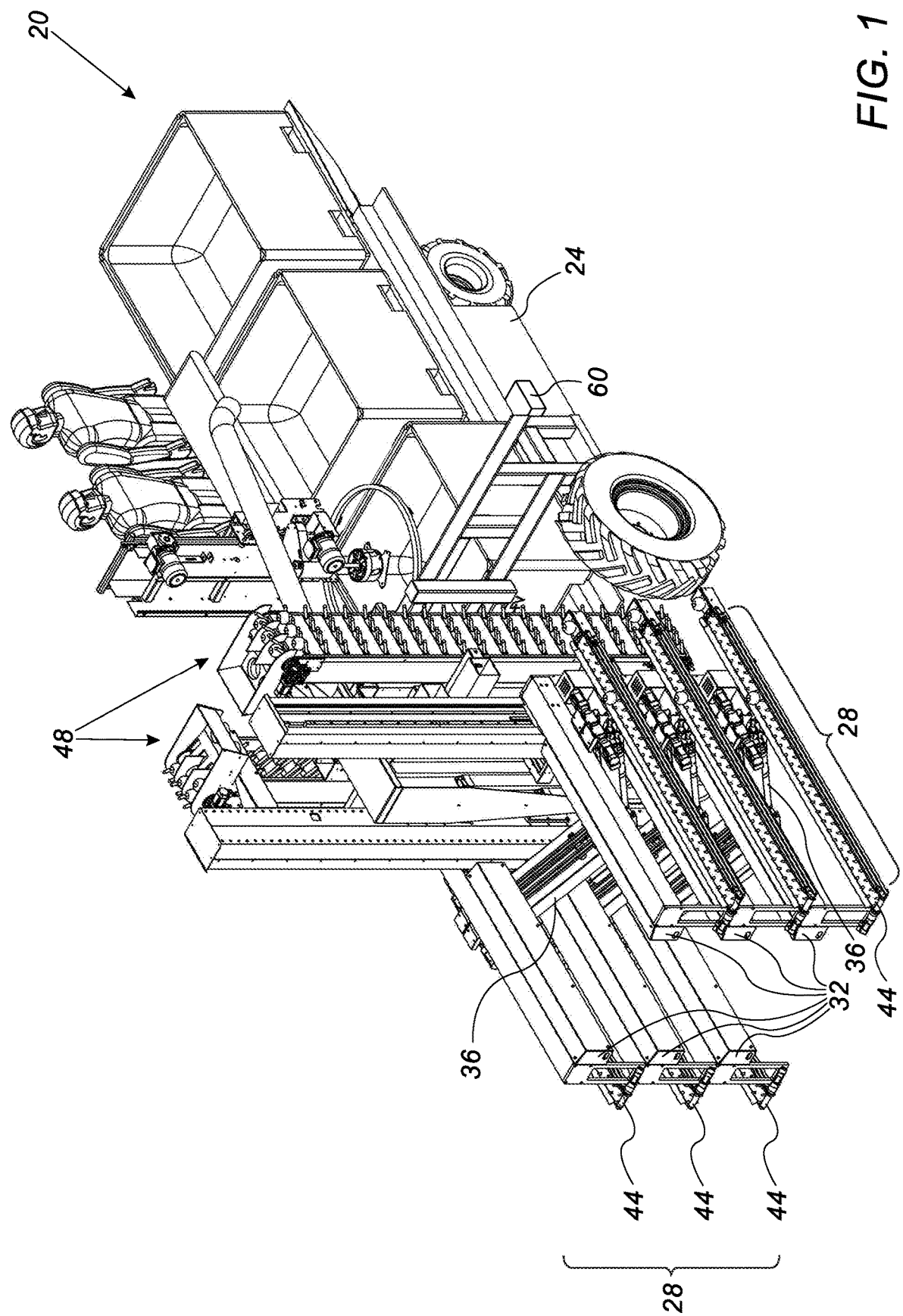
FIG. 1 is a pictorial illustration of a robotic fruit harvesting machine, in accordance with an embodiment of the present invention.

Embodiments of the present invention that are described herein provide improved robotic fruit-harvesting systems and associated harvesting methods. The embodiments described herein refer mainly to harvesting of apples, by way of example. The disclosed techniques, however, are applicable in a similar manner to harvesting of other suitable types of fruit and crop items in general.

In some embodiments, a harvesting system comprises a vertical frame configured to be positioned opposite a sector to be harvested. A plurality of four-dimensional (4-Degrees-of-Freedom—D.O.F) linear robots are mounted in the frame and configured to harvest fruit from the sector. The robots are arranged in pairs, which are stacked vertically in the frame. In an example embodiment, the frame comprises three pairs of robots. In an embodiment, two such frames are mounted back-to-back on a common platform, e.g., for harvesting two rows of an orchard simultaneously. The description that follows focuses on one frame, for clarity.

In a typical scenario, a row of trees is regarded as a "wall of fruit" to be harvested, and a sector is a portion of this "wall of fruit" that is harvested at a given position of the harvesting system. The dimensions of the sector are determined by the dimensions of the frame.

Each robot pair is mounted on a linear actuator (referred to as "stage") that is configured to move along the vertical axis in the frame, and each robot in the pair is configured to move horizontally along the stage. Thus, the two robots in a given pair move together along the vertical axis, and move independently of one another along the horizontal axis.

Each robot comprises a linear, telescopic robot arm comprising a suitable end-effector. The robot arm is configured to approach the sector and harvest fruit. In some embodiments, each robot arm comprises a pneumatic drive mechanism and an electrical-motor drive mechanism, both configured to extend and retract the robot arm. Typically, the pneumatic drive mechanism is configured to move the robot arm at a first speed, and the electrical-motor drive mechanism is configured to move the robot arm at a second speed, slower than the first speed. This dual drive mechanism enables the robot arm to combine fast and coarse movements into and out of the tree (using the pneumatic drive mechanism), with slower but more accurate movements (using the electrical-motor drive mechanism).

The system further comprises a plurality of cameras configured to acquire images of the sector. In an example embodiment, a respective camera is fitted on the base of each robot arm, so as to acquire images of the sector from a distance. Imaging from a distance (as opposed to moving cameras into and out of the tree together with the end-effectors) is advantageous for obtaining multiple points-of-view of the tree and fruit, and for avoiding dust, water, leaves and other obstacles.

A processor of the system is configured to identify the fruit in the images acquired by the cameras, and to control the robots to harvest the fruit. Typically, the processor constructs, based on the images, a model of the sector indicating 3-D coordinates of the fruit, fruit orientation and fruit status. The status of a given fruit may indicate, for example, whether the fruit is attached to the tree from the top, bottom or side, etc., whether the fruit is reachable by the robotic arm or blocked, and/or any other relevant information. From the model, the processor derives a work schedule for the plurality of the robots. Among other instructions, the work schedule specifies how the pairs of robots are to move among vertical positions, and in each vertical position of a pair of robots, how each of the robots in the pair is to move horizontally and harvest the fruit.

In some embodiments, the processor is configured to receive various directives, such as a target percentage of fruit to be harvested, or a target time duration to be spent opposite each sector. The processor derives, from the 3-D model of the sector, an optimal work schedule that best complies with the directives.

In some embodiments, the system is capable of identifying and harvesting clustered pairs of fruit. This feature increases productivity because, conventionally, only one fruit in a pair is harvested while the other is wasted. In some embodiments of the present invention the processor identifies in the images a clustered pair of fruit, and directs a pair of robots to adjoin horizontally with one another and to synchronously harvest both fruit of the clustered pair.

The mechanical configuration of the robots in the frame is designed to enable harvesting of clustered pairs of fruit. As will be described in detail below, the robots in each pair, which are mounted on a common stage, are able to operate independently when needed (for harvesting individual fruit) and to adjoin their arms closely together when needed (for harvesting clustered pairs of fruit).

An example process of harvesting a pair of apples by a synchronized pair of robots is described herein. In the disclosed process, two robots grip two apples in a cluster, and only then begin the actual picking of one apple after the other. In this manner, when the first apple is being picked, the other apple is already gripped and therefore does not drop or sustain damage.

System Description

FIG. 1 is a pictorial illustration of a robotic fruit harvesting machine 20, in accordance with an embodiment of the present invention. In the present example, machine 20 is designed for automated picking of apples.

Harvesting machine 20, also referred to herein as a harvesting system, comprises a portable platform 24 having one or more vertical frames 28 mounted thereon. Frames 28 are also referred to as "wings." Each frame 28 is configured to be positioned opposite a sector to be harvested. In the example of FIG. 1, system 20 comprises two frames 28 mounted back-to-back on platform 24. In this implementation system 20 moves in an aisle of an orchard, between two rows of trees. Platform 24 may move autonomously or it may be dragged by a tractor, for example.

Platform 24 is typically parked with frames 28 facing respective sector on either side of the aisle, for harvesting both sides of the row simultaneously. The distance between the two frames 28 may be configurable, to match the actual distance between the rows of trees, e.g., manually or automatically using electrical actuators and proximity sensors. In alternative embodiments, however, a single-frame implementation is also possible. The description that follows refers to the operation of a single frame 28, for the sake of clarity.

Figure 2:
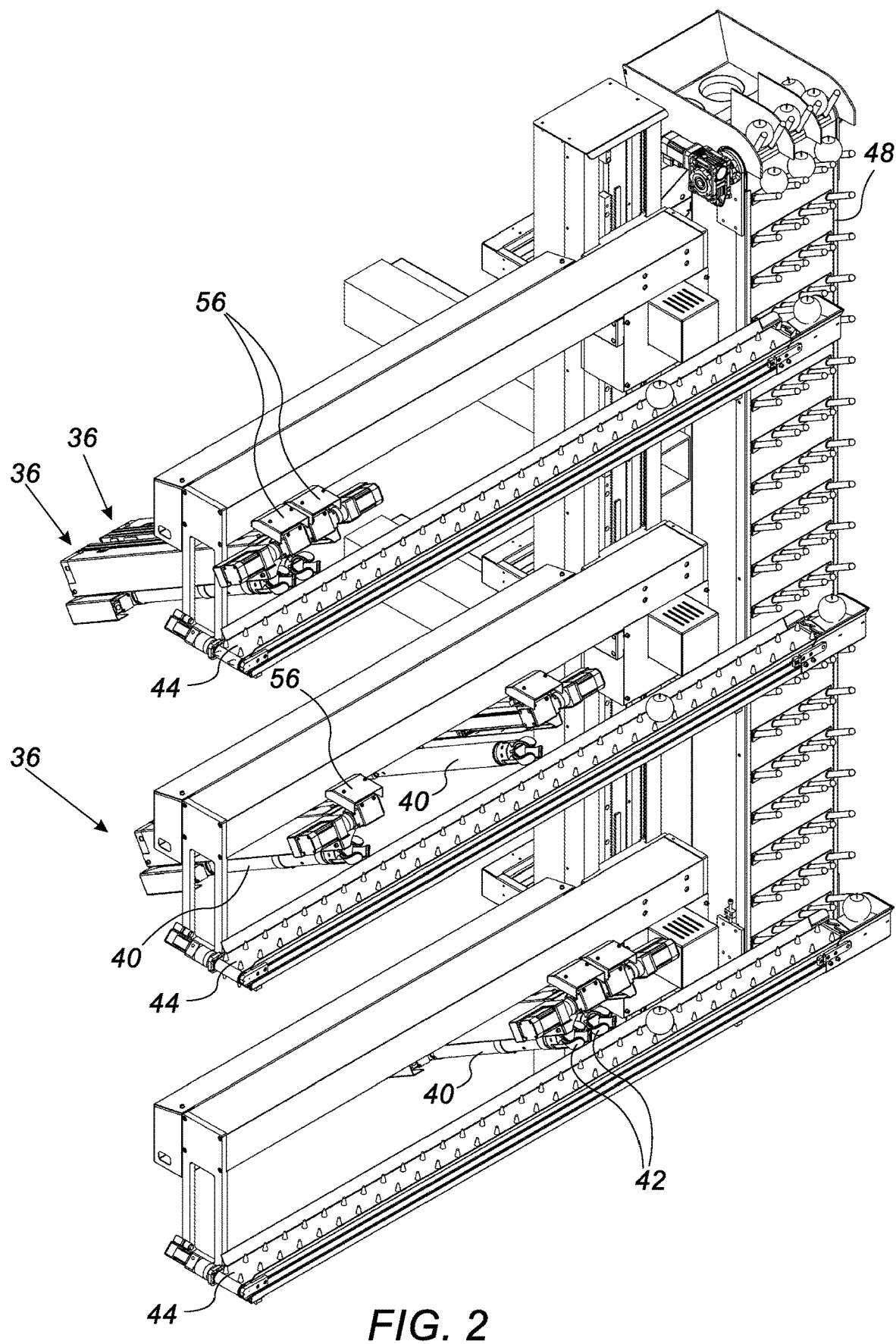
FIG. 2 is a pictorial illustration of a frame in the robotic fruit harvesting machine of FIG. 1, in accordance with an embodiment of the present invention.

FIG. 2 is a pictorial illustration showing elements of frame 28 in system 20, in accordance with an embodiment of the present invention. Reference is made jointly to FIGS. 1 and 2 for ease of explanation.

In an embodiment, three actuators 32 (also referred to as "linear stages" or simply "stages") are mounted in frame 28. Two actuators 36 (also referred to as "robots") are mounted on each actuator 32, facing the sector. Each actuator 32 in the present example comprises a horizontal rail that is capable of moving vertically in frame 28, e.g., using a suitable electrical motor. Each stage 32 is capable of moving vertically independently of the other stages 32. The total range of vertical movement of stages is designed to cover the full height of the sector. Mechanical and/or software limits are typically set to avoid collision between stages.

Each robot 36 is capable of moving horizontally along the stage 32 it is fitted on, e.g., using a suitable electrical motor. Mechanical and/or software limits are typically set to avoid collision between robots. Each robot comprises a linear, telescopic robot arm 40 that is configured to extend, approach the sector, harvest a fruit, and retract back toward frame 28.

Thus, each robot 36 has four fully controlled degrees-of-freedom—(i) vertical motion by the motion of stage 32, (ii) horizontal motion along the stage, (iii) motion into and out of the tree by motion of arm 40, and (iv) roll ("Theta"), i.e., rotation of arm 40 and the attached gripper about its longitudinal axis. The two robots 36 in a given pair (i.e., the two robots mounted on a given stage 32) are constrained to move together along the vertical axis, but are capable of moving independently of one another along the horizontal axis (along the stage), as well as into and out of the tree.

In various embodiments, the various moving parts of system 20 may be implemented using various types of linear actuators. The description that follows refers to the various actuators as "stages" 32, "robots" 36 and "arms" 40 to avoid confusion and better distinguish between the different system elements. Furthermore, each arm 40 typically comprises multiple actuators, as will be described below.

Typically, the pair of robots 36 on a given stage 32 are mounted at an inclined angle relative to the vertical plane of frame 28. This angle enables arms 40 to approach the fruit from an optimal angle of approach, which is not necessarily parallel to the ground. Typically, the angle of approach is software configurable, e.g., per individual robot 36, per pair of robots (i.e., per stage 32) or for all the robots in frame 28. Each robot arm 40 has a suitable end-effector ("gripper") 42 at its end.

In the present example the end-effector is configured to picking apples. In this example the end-effector comprises three fingers configured for gripping an apple, a force-limiter for limiting the gripping force applied to the apple by the fingers, and a proximity sensor for sensing proximity of the apple. The actual picking action is achieved by swiveling the end-effector about its longitudinal axis in eccentric motion (mechanical or controlled), retracting away from the tree. This process is addressed in detail below.

In alternative embodiments, e.g., for picking other types of fruit, any other suitable end-effector can be used. An end-effector for picking oranges, for example, may comprise the above-described fingers, force-limiter and proximity sensor, and additionally comprise a cutter for cutting an orange from the limb without damage.

In some embodiments, system 20 comprises multiple horizontal conveyers 44, one conveyer below each pair of robots 36. A vertical conveyer 48 is coupled to the horizontal conveyers of each frame 28. Each robot 36, after picking a fruit and retracting back toward frame 28, releases the fruit so that the fruit drops onto horizontal conveyer 44. The horizontal conveyer conveys the fruit to vertical conveyer 48, which collects the fruit from horizontal conveyers 44 of the frame and conveys them to a central conveyer (hidden from view in the figures). The central conveyer accumulates the fruit from both frames 28 and forwards the fruit for further processing, e.g., to a bin filler.

In some embodiments, system 20 further comprises a plurality of cameras 56 that are configured to acquire images of portions of the sector. Cameras 56 may comprise, for example, Red-Green-Blue (RGB), monochrome, Near Infrared (NIR) or other Infrared (IR), thermal, or other suitable type of cameras. In the present example, each camera 56 is fitted on the base of a corresponding robot arm 40. The camera thus moves vertically and horizontally with the robot, but not into and out of the tree.

System 20 further comprises a processor 60, which carries out the various computation tasks of the system. Among other tasks, processor 60 receives the images acquired by cameras 56, identify fruit (e.g., apples) in the images, and controls robots 36 to harvest the fruit. Processor 60 is typically configured to control robots 36 by (i) controlling the motors that move stages 32 vertically, (ii) controlling the motors that move robots 36 horizontally along stages 32, and (iii) controlling the drive mechanisms that move robot arms 40 and actuate end-effectors 42.

In some embodiments, once system 20 is positioned opposite a sector to be harvested, processor 60 moves cameras 56 (by moving robots 36) among multiple vertical and horizontal positions, and instructs the cameras to acquire images of the sector from the various positions, so as to obtain a large body of visual data that can be analyzed.

Based on the images received from cameras 56, processor 60 constructs a model of the sector indicating 3-D coordinates of the fruit. Processor 60 derives from the model a work schedule for robots 36. The work schedule assigns robots to fruit and specifies, for example, the vertical motion of each stage 32 as a function of time, the horizontal motion of each robot 36 along stage 32 as a function of time, and the operation of each robot arm 40 as a function of time.

In some embodiments, processor 60 receives user-defined directives for generating the work schedule. User-defined directives may comprise, for example:

A target percentage of fruit to be harvested (e.g., a directive to harvest at least 80% of the fruit).

A maximal time duration to be spent opposite each sector.

A directive of whether or not to harvest clustered pairs of fruit.

Characteristics that define fruit that are suitable for harvesting (e.g., size, color or level of ripeness).

Processor 60 derives, from the 3-D model of the sector, an optimal work schedule that best matches the directives.

Typically, processor 60 comprises one or more general-purpose processors, which are programmed in software to carry out the functions described herein. The software may be downloaded to any or all of the processors in electronic form, over a network, for example, or it may, alternatively or additionally, be provided and/or stored on non-transitory tangible media, such as magnetic, optical, or electronic memory.

Example Robot Arm Configuration

Figure 3:
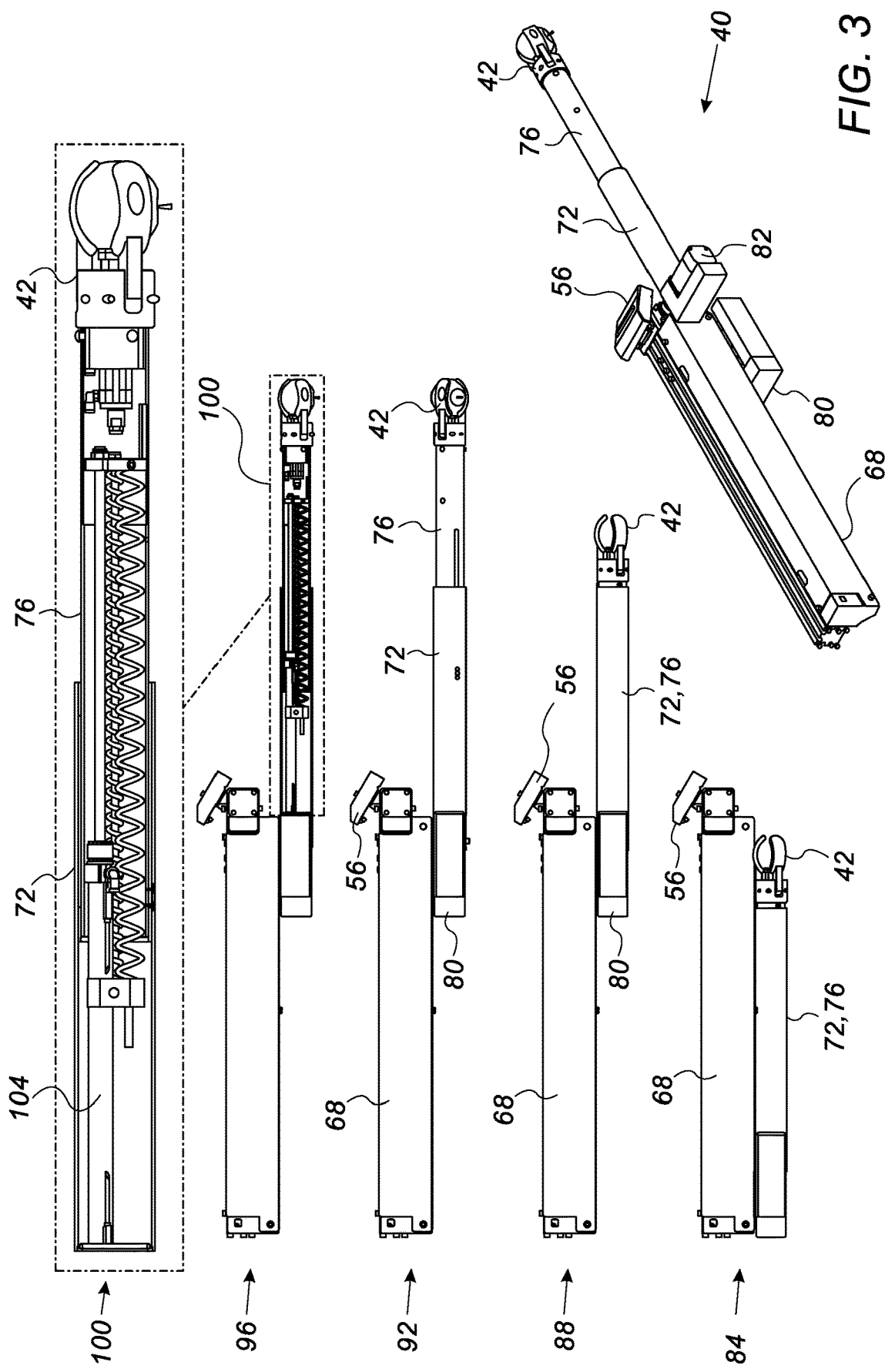
FIG. 3 is a diagram showing an isometric view and several side views of a robot arm, in accordance with an embodiment of the present invention.

FIG. 3 is a diagram showing several views of robot arm 40, in accordance with an embodiment of the present invention. Typically, all robot arms 40 of robots 36 in system 20 are of this structure.

An isometric view of robot arm 40 is shown at the bottom-right of the figure. Arm 40 comprises a base 68, and a telescopic assembly comprising an outer telescopic element 72 and an inner telescopic element. End effector ("gripper") 42 is seen at the distal end of inner telescopic element 76. Arm 40 further comprises a controlled swivel actuator 80 configured to rotate end-effector 42 about the longitudinal axis of arm 40, in order to pick a fruit (apple in the present example) that is held by the end-effector.

An electrical motor 82 is configured to drive an electrical drive mechanism that moves the telescopic assembly relative to base 68. In addition, a pneumatic drive mechanism (typically a pneumatic actuator, not seen in this view) is configured to extend and collapse the telescopic assembly, i.e., to move inner telescopic element 76 relative to outer telescopic element 72.

The isometric view shows arm 40 in its fully-extended (longest) position. The extension of arm 40 is achieved by (i) motion of outer telescopic element 72 relative to base 68, and (ii) motion of inner telescopic element 76 relative to outer telescopic element 72.

A side view 84 shows arm 40 in its fully-collapsed position (the shortest position, also referred to as the base position). In this position, outer telescopic element is fully collapsed relative to base 68, and inner telescopic element 76 is fully collapsed inside outer telescopic element 72.

A side view 88 shows arm 40 in a partially-extended position. In this position, outer telescopic element 72 is fully extended relative to base 68, but inner telescopic element 76 is fully collapsed inside outer telescopic element 72.

A side view 92 shows arm 40 in the fully-extended position (similarly to the isometric view). In this position, outer telescopic element 72 is fully extended relative to base 68, and inner telescopic element 76 is fully extended out of outer telescopic element 72.

A side view 96 is similar to side view 92, but with the interior of the telescopic assembly shown. A side view 100 is an enlarged view of the interior of telescopic elements 72 and 76. This view shows a pneumatic actuator 104 used for moving inner telescopic element 76 into and out of outer telescopic element 72.

In an embodiment, the electrical-motor drive mechanism moves the telescopic assembly relative to base 68, and the pneumatic drive mechanism moves inner telescopic element 76 relative to outer telescopic element 72. Alternatively, however, any of the two drive mechanisms can be used for moving any of the elements of arm 40.

Both the electrical drive mechanism (e.g., electrical motor 82) and the pneumatic drive mechanism (e.g., pneumatic actuator 104) are controlled by processor 60. Processor 60 is typically configured to sense and control the position and velocity of each drive mechanism in a closed loop. In an embodiment, the range of movement of the electrical drive mechanism is between 0-650 mm, and the range of movement of the pneumatic drive mechanism is an additional 0-300 mm. Thus, when operated together, the total range of movement of arm 40 is 0-950 mm between the fully-collapsed position and the fully-extended position. The horizontal gripping range of arm 40 is slightly lower, on the order of 0-820 mm, since the arms are inclined and not parallel to ground. The dimensions above are given purely by way of example. Any other suitable dimensions can be used in alternative embodiments.

The configurations of system 20 and its elements, such as robots 36 and arms 40, shown in FIGS. 1-3, are example configurations that are chosen purely for the sake of conceptual clarity. In alternative embodiments, any other suitable configurations can be used. For example, the system may have any other suitable number of stages 32 per frame 28, and/or any other suitable number of robots 36 per stage 32.

In an example embodiment, frame 28 provides a total harvesting area of 1300 mm (horizontal length) by 4400 mm (height). In this embodiment, the height dimension is covered in two positions of frame 28—A lower position in which the total height of frame 28 is 3700 mm (and arms 40 reach a height of ~3800 mm when fully extended due to their inclined angles), and an upper position in which the total height of frame 28 is 4300 mm (and arms 40 reach a height of ~4400 mm when fully extended). During transportation, the total height of frame 28 is 3700 mm.

In this embodiment, the width of machine 20 (the separation between the two frames 28) is 2700 mm when fully open, and 1700 mm when fully closed. In an alternative embodiment, the fully-open width of machine 20 is 2900 mm, the fully-closed width is 1800 mm, and the horizontal gripping range of arms 40 is approximately 0-880 mm. All the dimensions above are given purely by way of example. In alternative embodiments, any other suitable dimensions can be used.

Picking Of Clustered Pairs of Fruit

Conventional harvesting techniques are typically unable to harvest clusters of fruit. In some cases, prior to harvesting, a thinning process reduces clusters to single fruit, or at most to pairs of fruit. Conventional harvesting methods are typically able to pick only one fruit in a pair, whereas the other fruit is wasted.

In some embodiments of the present invention, the hardware and software of system 20 are designed to be able to harvest clustered pairs of fruit. This capability is facilitated by (i) the ability of a pair of robots 36 to adjoin their arms 40 closely together on stage 32, and (ii) a specially-designed process of picking a pair of clustered fruit in a coordinated manner by a pair of such robots 36.

Figure 4:
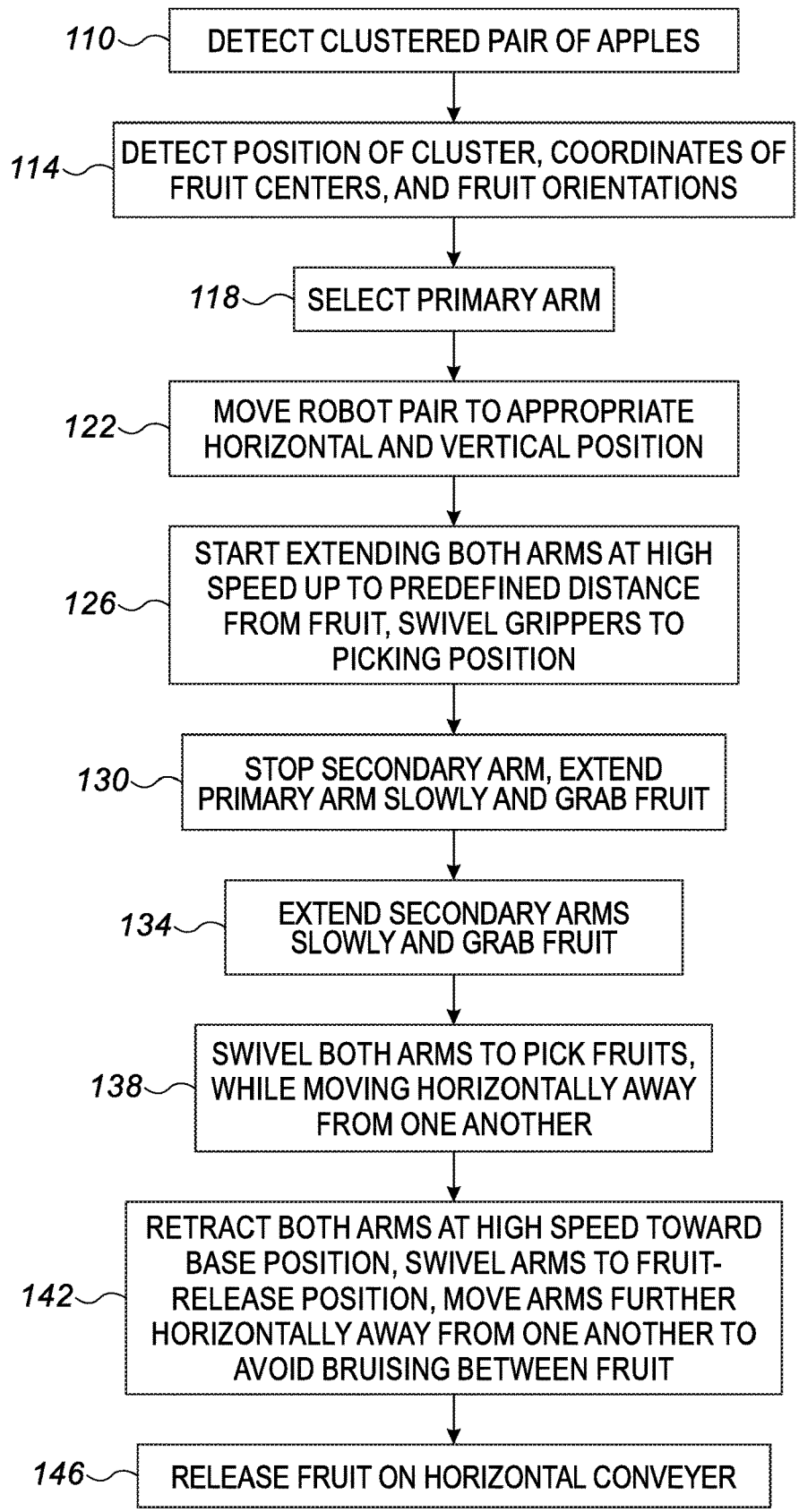
FIG. 4 is a flow chart that schematically illustrates a method for picking a clustered pair of apples, in accordance with an embodiment of the present invention.

FIG. 4 is a flow chart that schematically illustrates a method for picking a clustered pair of apples, in accordance with an embodiment of the present invention. The method is performed by a pair of robots 36 on a given stage 32, under control of processor 60. In some embodiments, the method of FIG. 4 is implemented as part of the overall work schedule for robots 36, as described above.

The method begins at a pair detection step 110, with processor 60 detecting a clustered pair of apples in the images acquired by cameras 56. At a pair geometry detection step 114, processor 60 estimates (i) the position coordinates of the clustered pair as a whole, (ii) the position coordinates of each individual apple in the pair, and (iii) the spatial orientation of each individual apple in the pair.

At an arm selection step 118, processor 60 assigns one of the two robot arms 40 to serve as a primary arm, and the second robot arm 40 to serve as a secondary arm. The assignment may be arbitrary, or based on some selection criterion. In an example embodiment, processor 60 chooses the primary arm based on the depth of each fruit in the tree (distance from frame 28), and/or the distance between each arm 40 and the respective fruit it is assigned to pick. Alternatively, any other suitable criterion can be used.

At a positioning step 122, processor 60 moves the pair of robots 36 to the appropriate horizontal and vertical position in frame 28, opposite the clustered pair of apples. As explained above, vertical movement is applied to the robots by moving stage 32 up or down. Horizontal movement is applied by moving robots 36 along stage 32.

At an initial approach step 126, processor 60 starts extending both arms 40 toward the clustered pair with high speed. In an embodiment, processor 60 continues the fast initial approach of an arm 40 until end-effector 42 of the arm reaches a predefined distance from the fruit.

During the initial approach, processor 60 swivels (rotates) end-effector 42 of each arm 40 about the longitudinal axis of the arm (using swivel actuator 80) to a roll-angle that is best suited for picking the corresponding fruit. This roll-angle is referred to as the "picking position" of the end-effector ("gripper"). Processor 60 may determine the appropriate roll-angles based on the estimated spatial orientations of the fruit (estimated at step 114 above).

At a primary-arm approach step 130, processor 60 stops the secondary arm, and extends the primary arm slowly. When the primary arm reaches the apple, processor 60 actuates end-effector 42 of the primary arm to grip the apple.

Then, at a secondary-arm approach step 134, processor 60 extends the secondary arm slowly. When the secondary arm reaches the apple, processor 60 actuates end-effector 42 of the secondary arm to grip the apple.

Now, after both arms have securely gripped their respective apples in the clustered pair, processor 60 instructs the two robots to pick the apples, at a picking step 138. Since both apples are gripped before starting the picking operation, picking of one apple will not cause the other apple to drop.

Typically, processor 60 actuates swivel actuators 80 of both arms to swivel the apples. At the same time, processor 60 moves the two arms horizontally (along stage 32) away from one another until reaching some predefined horizontal spacing. This action detaches the two apples from the tree, and also ensures that the apples are well separates from one another to avoid damage.

Then, at a retraction step 142, processor 60 retracts both robot arms away from the tree with high speed. At the same time, processor 60 swivels end-effectors 42 of arms 40 to a "fruit-release position," i.e., to a roll-angle that is best suited for dropping the apples onto horizontal conveyer 44.

Also at the same time, processor 60 moves the two arms horizontally further away from one another, until reaching a predefined horizontal spacing that is sufficient for avoiding bruising of the apples on conveyer 44. At a releasing step 146, processor 60 actuates end-effectors 42 of the two arms to release the apples onto conveyer 44.

The method flow of FIG. 4 is an example flow that is depicted purely for the sake of conceptual clarity. In alternative embodiments, processor 60 may control a pair of robots 36 in any other suitable way, for picking a clustered pair of apples in coordination.

Although the embodiments described herein mainly address harvesting of fruit, the methods and systems described herein can also be used in other applications, such as in applying pairs of robotic arms to perform other tasks such as thinning or pruning.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A harvesting system, comprising:
 a vertical frame configured to be positioned opposite a sector to be harvested;
 a plurality of linear robots, which are arranged in pairs stacked vertically in the frame, each pair comprising first and second robots that are configured to move together along a vertical axis, to move independently of one another along a horizontal axis, and have respective first and second robot arms that are configured to approach the sector and harvest fruit;
 a plurality of cameras configured to acquire images of the sector; and
 a processor, which identifies in the images a clustered pair of the fruit, and directs a pair of the robots to adjoin one another and to synchronously harvest both fruit of the clustered pair.

2. The system according to claim 1, wherein each of the robots has four degrees-of-freedom.

3. The system according to claim 1, wherein the processor directs the pair of the robots to grip both fruit of the clustered pair, and, only after both fruit are gripped, to pick the fruit of the clustered pair.

4. The system according to claim 1, wherein the processor is configured to construct, based on the images, a model of the sector indicating 3-D coordinates of the fruit, orientations of the fruit and status of the fruit, and to derive from the model a work schedule for the plurality of the robots, the work schedule specifying (i) moving of the pairs of robots among vertical positions, and (ii) in each vertical position of a pair of robots, moving each of the robots in the pair horizontally and harvesting the fruit.

5. The system according to claim 1, wherein each of the robot arms comprises a pneumatic drive mechanism and an electrical-motor drive mechanism, both configured to extend and retract the robot arm.

6. The system according to claim 5, wherein the processor is configured to control the robot arm to approach the sector by jointly driving the pneumatic drive mechanism and the electrical-motor drive mechanism.

7. A harvesting method, comprising:
 positioning, opposite a sector to be harvested, a vertical frame having a plurality of linear robots arranged in pairs and stacked vertically in the frame, each pair comprising first and second robots that are configured to move together along a vertical axis, to move independently of one another along a horizontal axis, and have respective first and second robot arms that are configured to approach the sector and harvest fruit;
 acquiring images of the sector using a plurality of cameras; and
 using a processor, identifying in the images a clustered pair of the fruit, and controlling a pair of the robots to adjoin one another and to synchronously harvest both fruit of the clustered pair.

8. The method according to claim 7, wherein each of the robots has four degrees-of-freedom.

9. The method according to claim 7, wherein controlling the robots comprises directing the pair of the robots to grip both fruit of the clustered pair, and, only after both fruit are gripped, to pick the fruit of the clustered pair.

10. The method according to claim 7, wherein controlling the robots comprises constructing, based on the images, a model of the sector indicating 3-D coordinates of the fruit, orientations of the fruit and status of the fruit, and deriving from the model a work schedule for the plurality of the robots, the work schedule specifying (i) moving of the pairs of robots among vertical positions, and (ii) in each vertical position of a pair of robots, moving each of the robots in the pair horizontally and harvesting the fruit.

11. The method according to claim 7, wherein each of the robot arms comprises a pneumatic drive mechanism and an electrical-motor drive mechanism, and wherein controlling the robots comprises controlling both the pneumatic drive mechanism and the electrical-motor drive mechanism to extend and retract the robot arm.

12. The method according to claim 11, wherein controlling the robots comprises controlling the robot arm to approach the sector by jointly driving the pneumatic drive mechanism and the electrical-motor drive mechanism.

\* \* \* \* \*